Figure 1:
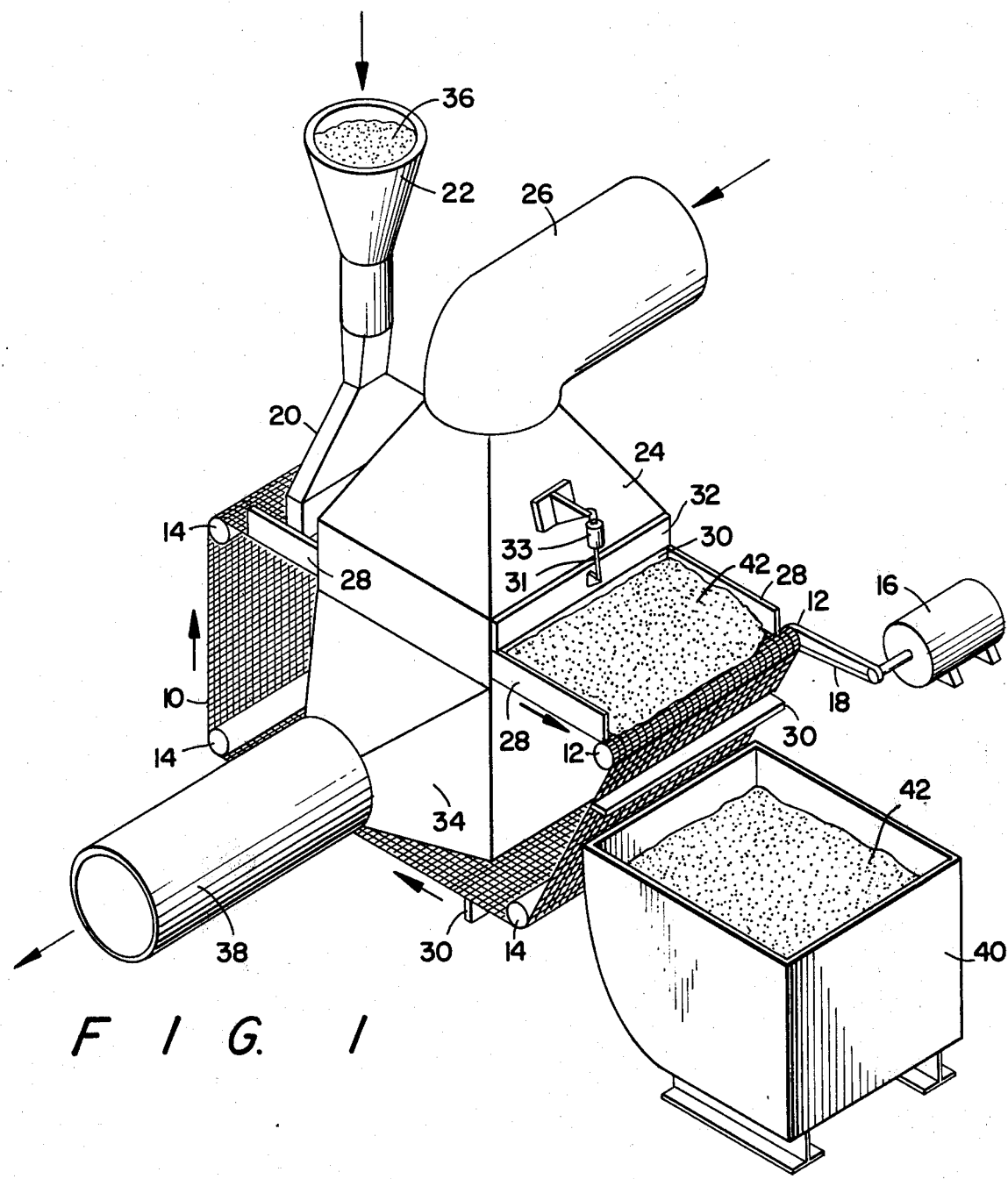

United States Patent [19]

Henderson, Jr. et al.

[11] 3,998,933
[45] Dec. 21, 1976

[54] COKE PARTICLE FILTER FOR PITCH FUMES TO FORM ELECTRODES

[75] Inventors: James Tillit Henderson, Jr.; Robert Burton Newman, both of Bay Village, Ohio

[73] Assignee: Union Carbide Corporation, New York, N.Y.

[22] Filed: Sept. 16, 1974

[21] Appl. No.: 506,535

[52] U.S. Cl. .................................. 423/448; 55/98; 55/351; 55/512; 264/29.3
[51] Int. Cl.² ........................................ C01B 31/04
[58] Field of Search ............................... 55/96–99, 55/351, 302, 354, 77, 390, 474, 512; 423/448; 264/29

[56] References Cited

UNITED STATES PATENTS

| | | | |
|---|---|---|---|
| 702,758 | 6/1902 | Acheson | 423/448 |
| 865,608 | 9/1907 | Price | 423/448 |
| 1,608,678 | 11/1926 | Smith | 55/96 |
| 3,050,378 | 8/1962 | Kron | 23/314 |
| 3,063,216 | 11/1962 | Silverman | 55/96 |
| 3,395,512 | 8/1968 | Finney, Jr. et al. | 55/97 |
| 3,405,508 | 10/1968 | Peters et al. | 55/77 |
| 3,745,748 | 7/1973 | Goldfield et al. | 55/97 |
| 3,754,378 | 8/1973 | Christenson et al. | 55/96 |

FOREIGN PATENTS OR APPLICATIONS

| | | | |
|---|---|---|---|
| 76,683 | 2/1918 | Switzerland | 55/474 |
| 778,537 | 7/1957 | United Kingdom | 55/302 |

*Primary Examiner*—Bernard Nozick
*Attorney, Agent, or Firm*—J. Hart Evans

[57] ABSTRACT

Vapor, volatile fumes and other contaminants are filtered from an air stream by passing it through a bed of filter particles, which may be coke and using the contaminant coke particles in the processing of electrodes.

18 Claims, 2 Drawing Figures

COKE PARTICLE FILTER FOR PITCH FUMES TO FORM ELECTRODES

FIELD OF THE INVENTION

This invention relates generally to the problem of providing pollution abatement method which will arrest or capture a vapor or volatile fume. More particularly, the invention relates to the recovery of the thinly dispersed aerosol which is emitted during many carbon production operations. Such aerosol may be organic or inorganic in composition and be in the liquid or solid physical state depending upon the carbon production operations involved, i.e., mixing, forming, impregnating, baking, etc. The effluents may be referred to as so called "volatiles" or "thin pitch fumes". We prefer the word "aerosol" as a general term to identify the carbon, soot, oils and tarry droplets that we wish to recover. Such aerosols are formed by the condensation of vapors evolving from heated binder pitches, impregnating pitches, tars, or lubricating oils and may also contain soot from the incomplete combustion of fuels in some baking operations.

PRIOR ART METHODS

Various types of equipment are presently available to destroy the carbon originated aerosol, but such equipment tends to be low in abatement efficiency, wasteful and costly to operate, or does not solve the problem of ultimate disposal. Total destruction in an incinerator is the most absolute abatement device for such aerosols and the efficiency of a properly designed incinerator will normally exceed 99%. This otherwise attractive device, however, requires great qualities of fuel and with the current energy crisis and fuel shortage such incineration is becoming less and less attractive.

Cascade scrubbers in series with electrostatic precipitators have been used for capturing similar aerosols, but have proved to have low operating efficiency, below 75%, and have had to be replaced in many places by thermal incinerators with the fuel consumption problem mentioned above. Various other techniques involving packed tower scrubbers and the like have been attempted over the years, but all have proved to have varying degrees and types of disadvantages.

SUMMARY OF THE INVENTION

According to the present invention, volatile laden air which has been cooled to at least about 65° C (150° F) is passed through a filter particle bed with a velocity of about 1,000 ft. per minute (300 meters per minute). The particles may be of varied sizes but from about ⅛ to ¼ inch (3 to 6 cms) is generally preferred. And while any inert material can be employed, particles of coke have particular processing advantages as can be seen.

When the aerosol laden air is passed through the filter particle bed the condensed volatiles and other aerosol particles impinge upon and are trapped by the filter particles. When sufficient aerosol has been trapped on the particle bed so as to reduce its efficiency to the point where a fresh bed is needed, the loaded or spent bed of particles is removed from the filter and processed in one of several ways. If inexpensive inert particles are used and satisfactory disposal area is available particles may be simply discarded. If coke is used as the filter particle however, it can be recycled as packing material where the harmful pollutant is driven off and burned, thus supplementing the fuel input to the furnace. Alternatively the spent coke filter media may be returned to the carbon plant raw materials supply and then used to make carbon products. Both procedures insure safe, complete, ultimate disposal of the pollutant.

THE DRAWINGS

In the drawings FIG. 1 is an isometric view of a filter apparatus according to the invention.

Figure 2:
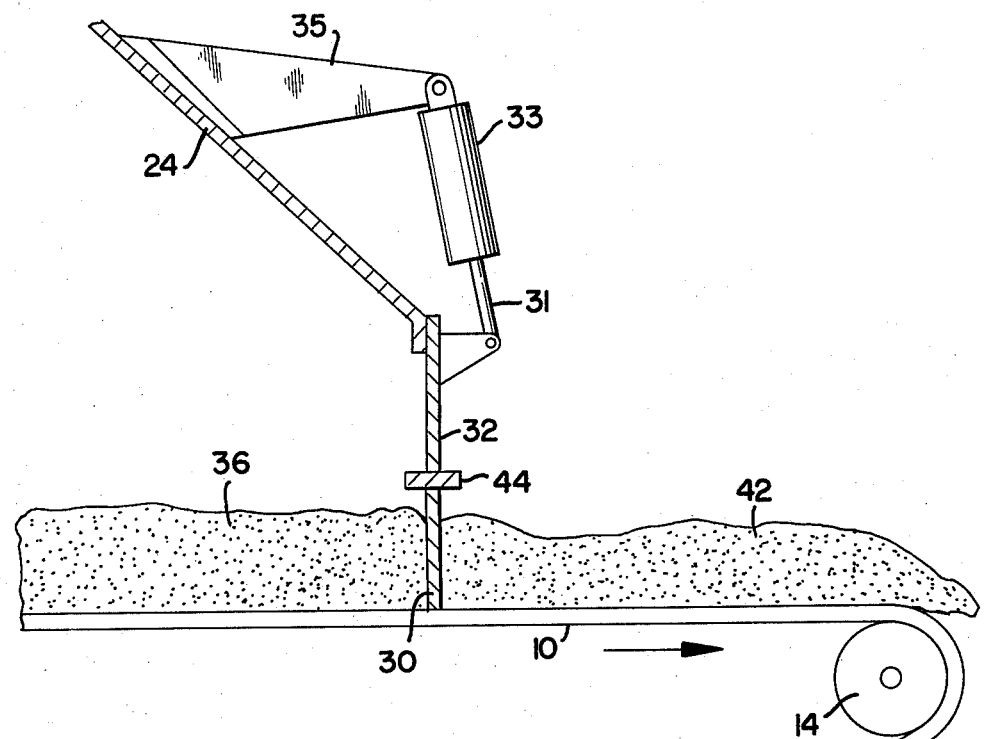
Figure 2:
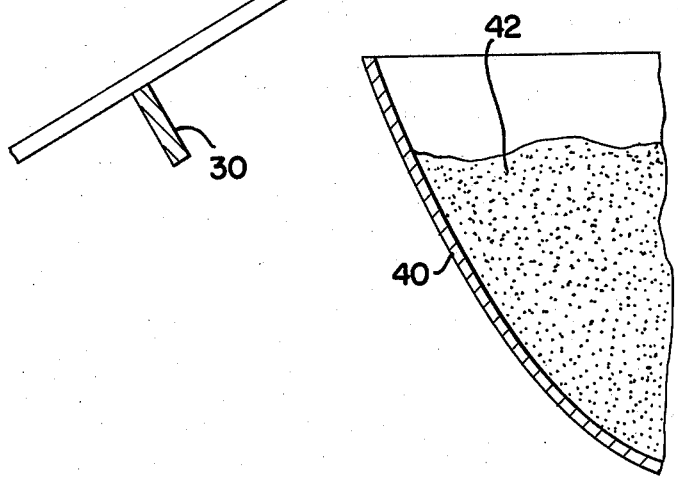

FIG. 2 is a partial section view of a portion of the machine, showing the door detail.

DESCRIPTION OF THE INVENTION

The filter embodiment in FIG. 1 comprises a screen belt 10 which goes around power roller 12 and idler rollers 14, power roller 12 being driven by a motor 16 through chain 18. The belt 10 runs under a distribution spout 20 which is connected to a feed hopper 22. An inlet plenum 24 covers the top surface of the belt 10 and an inlet duct 26 connects to the inlet plenum 24. Side boards 28 are positioned on both sides of the belt 10 at either end of the inlet plenum 24 to contain particles on the belt 10. Flights 30 attached to the belt 10 divide the belt 10 into sections equal in length to the span of the inlet plenum 24 over the belt 10. Moveable doors at either end of the inlet plenum 24 can be lowered by pistons 31 in cylinders 33 to engage and seal with the flights 30, thereby forming a relatively air-tight chamber under the inlet plenum 24 and above the belt 10. Below the inlet plenum 24 a relatively air-tight chamber is formed by the outlet plenum 34 from which leads exhaust duct 38. A disposal bin 40 is provided under one end of the belt 10 to receive spent particles 42.

FIG. 2, a partial section view of the particle discharge end of the filter shows in more detail the door 32 which moves in a vertical plane with its attached sealing edge 44 to engage the flight 30 and form a seal. The door 32 is raised and lowered by a piston 31 driven by a cylinder 33 attached by a bracket 35 to the inlet plenum 24. A similar arrangement exists at the other end of the inlet plenum 24.

In the operation of the filter according to the invention fresh filter particles 36 are fed into feed hopper 22 from which they move by gravity into distribution spout 20 which spreads them across the belt 10 to provide an even layer of particles. With the doors 32 raised the belt 10 moves in the direction indicated and the layer of fresh particles 36 moves under the inlet plenum 24 until the flights 30 are aligned with the raised doors 32 at either end of the inlet plenum 24. The motion of the belt 10 is then stopped and the doors 32 are lowered to form a seal with the flights 30. As the belt 10 is moving forward spent or loaded particles 42 are continually discharged from the end of the belt 10 above the disposal bin 40 into which they fall by gravity. With the doors 32 lowered and a bed of fresh particles 36 in place under the inlet plenum 24, aerosol laden air is passed through inlet duct 26 into the inlet plenum 24 and thence through the bed of particles 36. The vapors are trapped on the particles 36 and the cleansed air is exhausted from beneath the belt 10 through outlet plenum 34 and exhaust duct 38.

The filters of the present invention can use almost any type of solid particle, provided the particle does not fuse, disintegrate or otherwise deteriorate during the filtration process and is generally stable under the operating conditions. Such materials as crushed gravel, limestone, phosphorus slag coal and even very coarse sand can be used. Thus the material used can be relatively impervious, although a porous structure is generally preferred.

A preferred class of filter materials however is composed of the various cokes and coke type materials. These include petroleum coke, dried metallurgical coke, calcined petroleum coke, calcined metallurgical coke, graphitized petroleum coke and graphitized metallurgical coke as well as calcined coal. These materials are preferred first of all because they are generally somewhat porous in structure and hence can absorb aerosol particles to some extent in addition to trapping them by impingement. A further advantage of the materials however is the matter of their disposal after use. Gravel, limestone and the like must be discarded in a dump location after use, an environmentally undesirable procedure. Coke particles however, after use in the process of the invention, can then be further utilized as coke in a manner which safely and efficiently disposes of the aerosol coating the coke has acquired.

Thus coke particles of petroleum coke or the like can, after use in the process of the invention, be utilized in the manufacture of electrodes where the aerosol coating is assimilated in the electrode along with the binder employed. Another use of the spent coke filter material is as packing, either in saggers or in bulk pack around electrodes being baked. The aerosol coating when released from the particles by the heating can be used to supplement the fuel requirements of the baking oven.

Before utilization in the invention the filter particles, whether of coke or of other materials such as stone or the like, must be crushed and screened to suitable size. The process has been found to be operable with particles as small as 1/16 inch (1.5 mm) and as large as ½ inch (13mm). Plugging of the filter is more apt to occur with the very small sizes and with the largest sizes the velocity of the aerosol laden air stream must be increased appreciably to achieve entrapment. A preferred coke size is 25/12 screened material which includes particles from ⅛ inch (3 mm) to ¼ inch (6 mm) in diameter. With impervious particles such as crushed stone a particle size range from about 3/16 inch (4.5 mm) to ⅜ inch (9 mm) is preferred.

The depth of the particle bed in the filter can vary from as little as 1½ inch (3.75 cm) to as much as 6 inches (15 cm). A preferred depth is about 2 inches (5 cm), although in general the larger particle sizes require somewhat thicker beds. Too deep a bed results in too great a resistance to the flow of the contaminated air with under-utilization of the bed. The bed, regardless of depth, does not ordinarily require any external heating or cooling.

As described earlier the invention is directed primarily to the treatment of air streams laden with aerosols particularly the volatiles or thin pitch fumes evolved at various stages of carbon processing, including mixing, forming, impregnating, baking, graphitizing and the like. A particularly troublesome operation, wth regard to the generation of various fumes, is the impregnation of electrodes with liquid pitch. This is done under pressure in large autoclaves. These impregnation tanks evolve large quantities of aerosol when they are opened to insert or remove electrodes. We have found the present invention to be particularly useful in capturing and disposing of these fumes. Aerosol type vapors from nearly any source, however, carbonaceous or not, can be advantageously captured by our filter.

In the operation of our process the aerosol stream is generally diluted with air to achieve the desired temperature of the inlet stream to the filter.

The temperature of the aerosol stream approaching the filter should be low enough to condense the volatiles so that they can impinge on the filter particles. A temperature of 65° C (150° F) will normally be low enough to achieve this.

Another important factor in the operation of the process according to the invention is the velocity of the contaminant laden stream. It must be high enough that the contaminant particles, including aerosol droplets, impinge on the surfaces of the filter particles and they are trapped in the bed. The required velocity will vary somewhat according to the size of the particles in the bed, with the larger sized particles mandating a higher velocity. With ½ inch (13mm) particles for example, a minimum velocity of 2,000 feet per minute (600 meters per minute) is necessary. With the preferred 25/12 screened mixture a velocity of 500 feet per minute (150 meters per minute) is sufficient. The optimun design velocity is about 1,000 feet per minute (300 meters per minute).

As aerosol and other particles are captured on the filter particles and the filter loads up, the volume of contaminant laden air passing through the filter gradually decreases. If the filter is overloaded its ability to entrap contaminant particles will begin to diminish and the particles will be passed through the filter rather than stopped. The maximum contaminant load which the average filter can capture without substantial impairment of its efficiency is about 4 percent of the weight of the clean filter particles. For maximum efficiency we have found that a loading of 2 percent of the weight of the clean filter is preferred. A convenient way of determining when the filter is loaded to the desired degree is to constantly meter the power required to operate the fan which blows or pulls the contaminated air through the filter. As the filter loads up the volume of air passing through the filter decreases and hence the power requirement of the fan gradually decreases in a consistent manner. Simple experimentation will reveal the power load corresponding to the desired degree of loading of the filter.

When the filter bed has become loaded it is simply dumped out or otherwise removed and replaced by fresh material. In the embodiment of apparatus shown in the drawings the doors 32 are raised and the screen belt 10 supporting the filter bed is simply moved forward the equivalent of the distance between two adjacent flights 30. This dumps the spent particles 42 off the end of the belt 10 and positions a load of fresh particles 36 under the inlet plenum 24. Changing the bed in this type of apparatus requires about 45 seconds.

While the invention has been illustrated with a particular apparatus in the drawing it is to be understood that the invention is not limited to this type of apparatus but can employ any apparatus which will channel contaminated air through a particle filter bed.

EXAMPLE I

Calcined petroleum coke particles varying from about ⅛ inch (3.175 mm) to ¼ inch (6.25 mm) in diameter were placed in a filter area of 5.27 square feet (0.490 sq. meters) in a bed of 2¾ inches (6.985 cm) thick. A pitch aerosol evolving from a carbon baking furnace was cooled by dilution with ambient air to a temperature of 113° F or 7.22° C and 5,618 actual cubic feet per minute (159 cubic meters per minute) were passed through this filter bed at a velocity of 1066 feet per minute (324.9 meters per minute). The harmful aerosol concentration was reduced by 98.4 percent.

EXAMPLE II

Calcined petroleum coke particles varying from about ⅛ inch (3.175 mm) to ¼ inch (6.25 mm) in diameter were placed in a filter area of 32 square feet (2.97 sq. meters) in a bed 3 inches (7.62 cm) deep. A pitch aerosol evolving from an open autoclave was picked up by a hood with ambient air and the resulting stream was at a temperature which varied from about 70° F (21.1° C) to about 85° F (29.4° C) over a 20 minute period. The volume was 16,064 actual cubic feet per minute (454.93 cubic meters per minute) resulting in a velocity of 502 feet per minute (153 meters per minute) through the filter with an efficiency of aerosol capture of 99.2 percent.

EXAMPLE III

Metallurgical coke particles varying from about 3/32 inch (7.38 mm) to ⅓ inch (8.46 mm) in diameter were placed in a filter area of 32 square feet (2.97 sq. meters) in a bed 2 inches (5.08 cm) deep. A pitch aerosol evolving from an open autoclave was picked up by a hood with ambient air and the resulting stream was at a temperature of 73° F (22.8° C). The volume was 17,856 actual cubic feet per minute (505.68 cubic meters per minute) resulting in a velocity of 558 feet per minute (170 meters per minute) through the filter with an efficiency of aerosol capture of 89.7 percent.

EXAMPLE IV

Graphitized metallurgical coke particles varying from about ⅛ inch (3.175 mm) to ¼ inch (6.35 mm) in diameter were placed in a filter area of 6.33 square feet (0.588 sq. meters) in a bed 3 inches (7.62 cm) thick. A pitch aerosol evolving from a carbon baking furnace was cooled by dilution with ambient air to a temperature of 135° F (57° C) and 8106 actual cubic feet per minute (303 cubic meters per minute) were passed through this filter bed at a velocity of 1691 feet per minute (515 meters per minute) with an efficiency of aerosol capture of 80.2 percent.

What is claimed is:

1. Modified process in carbon product manufacture which comprises passing aerosol contaminant laden fumes from a carbon processing operation through a filter bed of coke particles to trap and retain said contaminants and then using the resultant contaminant coated coke particles in the feedstock for the manufacture of carbon electrodes.

2. Process according to claim 1 wherein said filter particles are from about 1/16 inch (1.5 mm) to about ½ (13 mm) in diameter.

3. Process according to claim 1 wherein said filter particles are from about 3/16 inch (4.5 mm) to about ⅜ inch (9 mm) in diameter.

4. Process according to claim 1 wherein said coke type filter particles are from about ⅛ inch (3 mm) to about ¼ inch (6 mm) in diameter.

5. Process according to claim 1 wherein the depth of said filter bed is from about 1½ inches (3.75 cm) to about 6 inches (15 cm).

6. Process according to claim 1 wherein the depth of said filter bed is about 2 inches (5 cm).

7. Process according to claim 1 wherein the temperature of said contaminant laden air is no higher than about 65° C (150° F).

8. Process according to claim 1 wherein the velocity of said contaminant laden air is at least 500 feet per minute (150 meters per minute).

9. Process according to claim 1 wherein the velocity of said contaminant laden air is about 1000 feet per minute (300 meters per minute).

10. Modified process in carbon product manufacture which comprises passing aerosol contaminant laden fumes from a carbon processing operation through a filter bed of coke particles to trap and retain said contaminants and then using the resultant contaminant coated coke particles as packing around electrodes in the heat processing of electrodes.

11. Process according to claim 10 wherein said filter particles are from about 1/16 inch (1.5 mm) to about ½ (13 mm) in diameter.

12. Process according to claim 10 wherein said filter particles are from about 3/16 inch (4.5 mm) to about ⅜ inch (9 mm) in diameter.

13. Process according to claim 10 wherein said coke type filter particles are from about ⅛ inch (3 mm) to about ¼ inch (6 mm) in diameter.

14. Process according to claim 10 wherein the depth of said filter bed is from about 1½ inches (3.75 cm) to about 6 inches (15 cm).

15. Process according to claim 10 wherein the depth of said filter bed is about 2 inches (5 cm).

16. Process according to claim 10 wherein the temperature of said contaminant laden air is no higher than about 65° C (150° F).

17. Process according to claim 10 wherein the velocity of said contaminant laden air is at least 500 feet per minute (150 meters per minute).

18. Process according to claim 10 wherein the velocity of said contaminant laden air is about 1000 feet per minute (300 meters per minute).

* * * * *